United States Patent [19]

Kato et al.

[11] Patent Number: 4,654,738
[45] Date of Patent: Mar. 31, 1987

[54] HEAD DRUM CONSTRUCTION INCLUDING MAGNETICALLY SHIELDED RECORD AND REPRODUCE SIGNAL PATHS

[75] Inventors: Hiroshi Kato, Yokohama; Shoji Kikunaga, Tokyo; Koichi Sugama, Kawasaki, all of Japan

[73] Assignee: Victor Company of Japan Limited, Yokahama, Japan

[21] Appl. No.: 824,315

[22] Filed: Jan. 31, 1986

Related U.S. Application Data

[63] Continuation of Ser. No. 497,858, May 25, 1983, abandoned.

[30] Foreign Application Priority Data

May 25, 1982 [JP] Japan .............................. 57-76854[U]

[51] Int. Cl.⁴ .......................... G11B 21/04; G11B 5/54
[52] U.S. Cl. ................................. 360/108; 360/130.24
[58] Field of Search .................. 360/84, 85, 104, 107, 360/108, 130.22, 130.23, 130.24, 33.1, 64

[56] References Cited

U.S. PATENT DOCUMENTS 3,202,771  8/1965  Wada ................................ 179/100.2
4,031,558  6/1977  Kusaka ................................ 360/130
4,117,519  9/1978  Shioyama et al. ..................... 360/84

Primary Examiner—Stuart N. Hecker
Assistant Examiner—Benjamin E. Urcia
Attorney, Agent, or Firm—Cushman, Darby & Cushman

[57] ABSTRACT

A head drum construction for use in a magnetic recording and reproducing apparatus such as a VTR apparatus comprises a rotatable drum having first and second axially opposite surfaces, a recording magnetic transducer such as a recording magnetic head mounted on the rotatable drum for recording information signals on a magnetic tape, a playback monitoring magnetic transducer such as a reproducing magnetic head mounted on the rotatable drum for reproducing, with a time delay, the information signals recorded on the magnetic tape by the recording magnetic transducer, a first signal transmission path connected to the recording magnetic transducer and disposed on the first surface, and a second signal transmission path connected to the playback monitoring magnetic transducer and disposed on the second surface.

5 Claims, 2 Drawing Figures

HEAD DRUM CONSTRUCTION INCLUDING MAGNETICALLY SHIELDED RECORD AND REPRODUCE SIGNAL PATHS

This is a continuation of application Ser. No. 497,858, filed May 25, 1983, which was abandoned upon the filing hereof.

BACKGROUND OF THE INVENTION

The present invention relates to a head drum construction for use in a magnetic tape recording and reproducing apparatus such as VTR apparatus.

Some magnetic tape recording and reproducing apparatus such as VTR apparatus have a recording video head and a playback monitoring video head which are combined in a single head drum construction. The playback monitoring video head serves to reproduce, with a short time delay, signals recorded on a magnetic tape by the recording video head in order that the user can record video information while confirming proper recording operation. The level of signals processed by the recording video head is more than ten thousand times that of signals that the playback monitoring head processes. Therefore, there is a strong tendency for such a head drum construction to suffer from crosstalk due to electromagnetic coupling of energy from the recording head to the monitoring head. No mechanical means have been incorporated in the prior head drum for preventing such an unwanted signal interference from occurring. It would be possible to insert an amplifier in a playback signal transmission system for electrically suppressing crosstalk by reducing the difference between the signal levels. However, incorporating such an additional electric circuit would render VTR apparatus complicated in structure, result in a reduced rate of production of VTR apparatus and make the repairing thereof difficult. The cost of manufacture of VTR apparatus with such amplifiers would be so prohibitive that they could not be mass-produced. The conventional head drum constructions have had no effective means for reducing the undesirable crosstalk to allow good playback monitoring.

SUMMARY OF THE INVENTION

It is an object of the present invention to provide a head drum construction for magnetic recording and reproducing apparatus which is constructed to sufficiently suppress crosstalk due to coupling of energy from a recording head to a playback monitoring head.

According to the present invention, there is provided a head drum construction for use in a magnetic recording and reproducing apparatus such as a VTR apparatus, comprising a rotatable drum having first and second axially opposite surfaces, a recording magnetic transducer such as a recording magnetic head mounted on the rotatable drum for recording information signals on a magnetic tape, a playback monitoring magnetic transducer such as a reproducing magnetic head mounted on the rotatable drum for reproducing, with a time delay, the information signals recorded on the magnetic tape by the recording magnetic transducer, a first signal transmission path connected to the recording magnetic transducer and disposed on the first surface, and a second signal transmission path connected to the playback monitoring magnetic transducer and disposed on the second surface.

The above and other objects, features and advantages of the present invention will become apparent from the following description when taken in conjunction with reference to the accompanying drawings.

DETAILED DESCRIPTION

Figure 1:
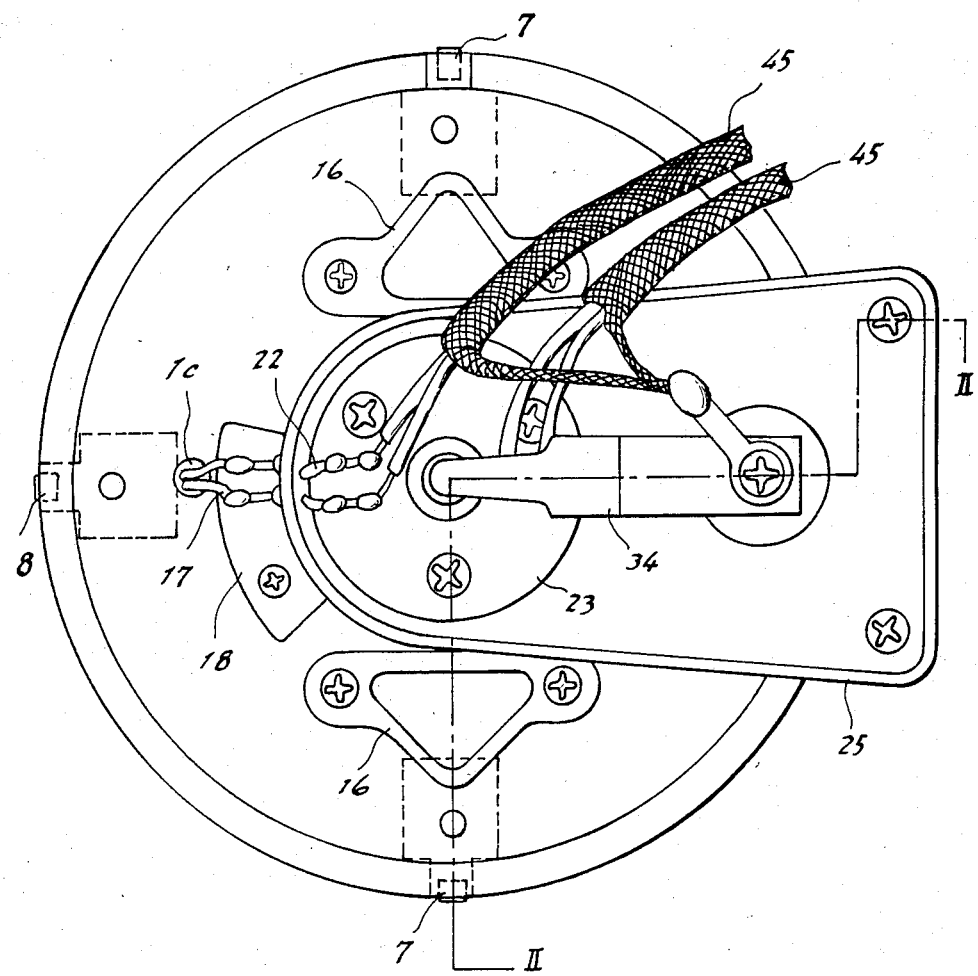
FIG. 1 is a plan view of a head drum construction according to the present invention.
Figure 2:
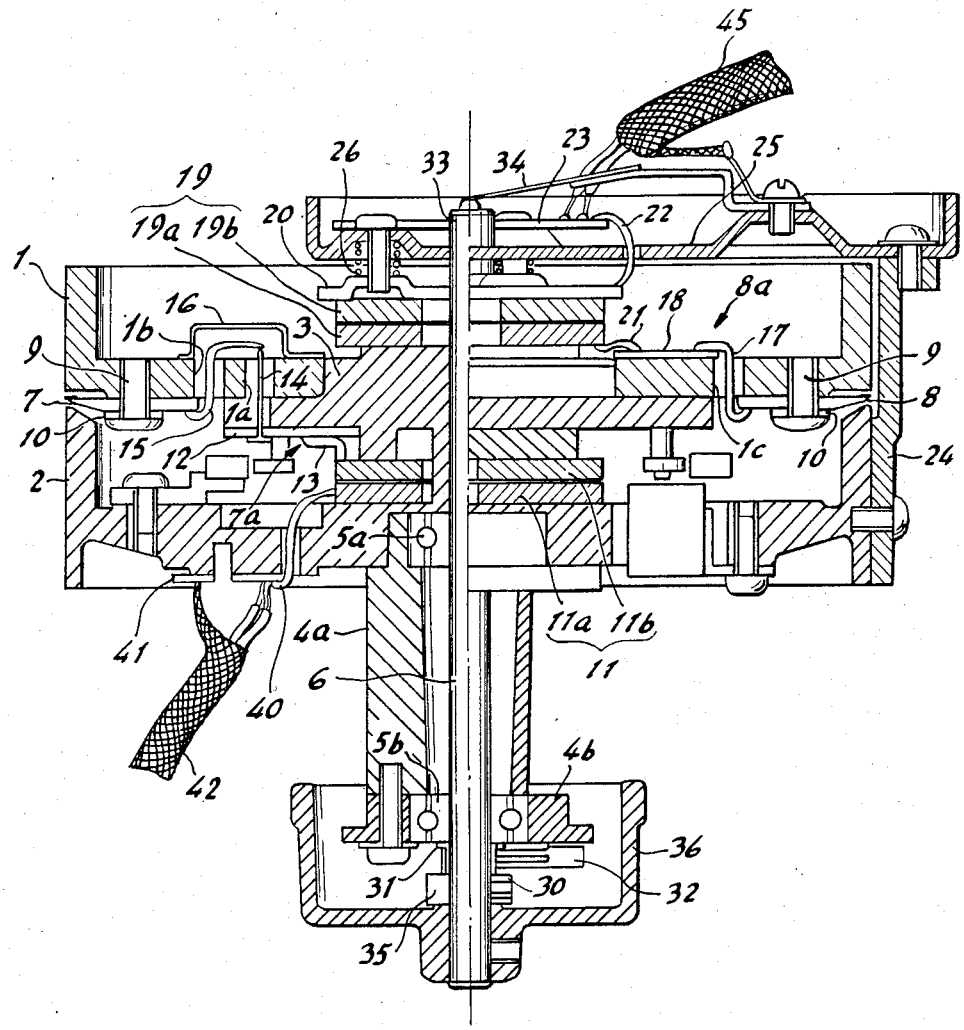
FIG. 2 is an axial cross-sectional view taken along line II—II of FIG. 2.

As shown, a head drum construction comprises an upper rotatable drum 1, a lower fixed drum 2, and a flywheel 3. The fixed drum 2 is secured, together with bearing holders 4a, 4b, to a chassis (not shown) of a magnetic recording and reproducing apparatus. The flywheel 3 is force-fitted over a shaft 6 rotatably journalled by ball bearings 5a, 5b in the bearing holders 4a, 4b. The rotatable drum 1 is affixed to the flywheel 3.

The rotatable drum 1 supports on its lower surface a pair of recording video heads 7 and a pair of playback monitoring video heads 8 which are fastened in position by screws 9 with spacers 10. The recording video heads 7 are located in diametrically opposite relation, and the playback monitoring heads 8 are also positioned in diametrically opposite relation. The heads 7, 8 are mutually angularly spaced 90°.

A signal transmission path or circuit 7a for transmitting signals to each recording video head 7 is disposed substantially below a lower surface of the rotatable drum 1. The signal transmission path 7a comprises a rotary transformer 11 composed of a stator 11a secured to the fixed drum 2 and a rotor 11b fastened to a lower surface of the flywheel 3, a printed-circuit board 12 fixed to the lower surface of the flywheel 3, a pair of wires 13 (only one shown) interconnecting the rotor 11b and the printed-circuit board 12, a pair of relay pins 14 (only one shown) soldered to the printed-circuit board 12 and projecting upwardly through an aperture 1a in the rotatable drum 1 above an upper surface thereof, and a pair of wires 15 (only one shown) interconnecting the recording video head 7 and the relay pins 14. The wires 15 extend from the recording video head 7 through an aperture 1b in the rotatable drum 1 over the upper surface thereof, where the wires 15 are soldered to the pins 14. The wire 15 can therefore be assembled and serviced with ease. The wires 15, the pins 14 and the apertures 1a, 1b are covered by a shield cover 16 attached to the upper surface of the rotatable drum 1.

A signal transmission path or circuit 8a for transmitting signals from each playback monitoring video head 8 is disposed on the upper surface of the rotatable drum 1. The signal transmission path 8a is composed of a pair of wires 17 leading from the playback monitoring video head 8 through an aperture 1c in the drum 1, a printed-circuit board 18 to which an end of each wire 17 is soldered, a rotary transformer 19 comprising a rotor 19a attached to the flywheel 3 and a stator 19b mounted on a back plate 20, a pair of wires 21 (only one shown) interconnecting the printed-circuit board 18 and the rotor 19a, a pair of wires 22 (only one shown) leading from the stator 19b, and a printed-circuit board 23 to which ends of the wires 22 are soldered.

The signal transmission path 7a below the rotatable drum 1 is shielded from the signal transmission path 8a above the rotatable drum 1 by the rotatable drum 1 and the flywheel 3 which serve as shields, and the shield cover 16. Any signals picked up by the playback monitoring head 8 are transmitted over the signal transmission path 8a without being appreciably affected by signals transmitted over the signal transmission path 7a to the recording video head 7. As a result, substantially pure playback signals with no recording signals mixed therein can be delivered to a monitor signal processing circuit for crosstalk-free playback monitoring.

The back plate 20 and the printed-circuit board 23 are fastened by screws to an overhanging plate 25 fixed to the top of a block 24 screwed to the fixed drum 2. Springs are disposed between the back plate 20 and the overhanging plate 25 for allowing the back plate 20 to be finely adjusted in height.

A pair of wires 40 (only one shown) of the stator 11a of the rotary transformer 11 are connected to a printed-circuit board 41 mounted on the lower surface of the fixed drum 2. To the printed-circuit board 41, the recording signals are fed over a cable 42 having two cores and a shielding sheath which is connected to the fixed drum 2 through the printed-circuit board 41. From the printed-circuit board 23, the playback signals are delivered to the monitor signal processing circuit over a cable 45 having two cores and a shielding sheath which is connected to the overhanging plate 25 through a lug.

The rotatable shaft 6 supports on its lower portion a grounding collar 30 and a slip ring 31, and on its upper portion a grounding cap 33. Brushes 32 and 34 are fixed to the bearing holder 4b and the overhanging plate 25 so as to contact with the slip ring 31 and the grounding cap 33, respectively.

Therefore, an undesirable ground current with respect to the signal transmission path 7a for recording purpose flows through the rotatable drum 1, the flywheel 3, the lower portion of the rotatable shaft 6, the brush 32, the bearing holder 4a and the fixed drum 2. While, an undesirable ground current with respect to the signal transmission path 8b for monitoring purpose flows through the rotatable drum 1, the flywheel 3, the upper portion of the rotatable shaft 6 and the brush 34. Accordingly, the undesirable ground current with respect to the signal transmission paths 7a and 8a flow along substantially different paths from each other. This is also effective in reducing the undesirable crosstalk.

The rotatable shaft 6 is mounted in the ball bearings 5a, 5b as they are pre-loaded by a stop ring 35 attached to a lower end portion of the rotatable shaft 6. The rotatable shaft 6 is rotated by a belt (not shown) trained around a pulley 36 affixed to the lower end portion of the rotatable shaft 6 for rotating the drum 1 and the flywheel 3 in unison at high speed.

With the arrangement of the head drum construction according to the present invention, the rotatable drum as well as the shield cover serves to shield the signal transmission path connected to the recording video head from the signal transmission path connected to the playback monitoring video head. Any unwanted crosstalk can be sufficiently suppressed which would otherwise be occasioned by recording signals mixed with playback monitoring signals, thereby permitting signals that have just been recorded to be monitored well. Since the rotatable drum itself is employed as a shield, the overall head drum construction is relatively simple and can easily be assembled and serviced.

Although a certain preferred embodiment has been shown and described in detail, it should be understood that various changes and modifications may be made therein without departing from the scope of the appended claims.

What is claimed is:

1. A head drum construction for use in a magnetic recording and reproducing apparatus, comprising:
    (a) a fixed drum having substantially planar surfaces;
    (b) a rotatable drum rotatable relative to said fixed drum and having first and second surfaces which are substantially planar and which are substantially parallel to each other, said substantially planar surfaces of said fixed drum being perpendicular to the axis of rotation of said rotatable drum, said rotatable drum being made of a magnetic shielding material;
    (c) an overhanging plate fixedly secured to said fixed drum so as to be placed over said rotatable drum;
    (d) a pair of recording magnetic transducers for recording signals on a magnetic medium, said recording magnetic transducers being disposed on said first surface of said rotatable drum facing said fixed drum;
    (e) a pair of playback monitoring magnetic transducers for reproducing the signals recorded by said recording magnetic transducers on said magnetic medium, said playback monitoring magnetic transducers being disposed on said first surface of said rotatable drum facing said fixed drum;
    (f) a first rotary transformer comprising a first rotor fixed with respect to said first surface of said rotatable drum and a first stator fixed to the surface of said fixed drum facing said rotatable drum so as to axially confront said first rotor thereof;
    (g) a second rotary transformer disposed to be axially spaced from said first rotary transformer with said rotatable drum interposed therebetween, and comprising a second rotor fixed with respect to said second surface of said rotatable drum and a second stator fixed to said overhanging plate to axially confront said second rotor; and
    (h) a pair of first signal transmission paths respectively provided between said pair of recording magnetic transducers and said first rotor, and a pair of second signal transmission paths respectively provided between said pair of playback monitoring magnetic transducers and said second rotor, said first transmission paths being electrically joined through said first stator to a first signal cable and said second transmission paths being electrically joined through said second stator to a second signal cable, extending away from each other with said rotatable drum therebetween, whereby said rotatable drum serves as a crosstalk shield between said first and second rotary transformers, between said first and secnd signal cables, and between said recording magnetic transducer and said playback monitoring magnetic transducer.

2. A head drum construction for use in a magnetic recording and reproducing apparatus, comprising:
    (a) a fixed drum having substantially planar surfaces;
    (b) rotatable drum means rotatable relative to said fixed drum and having first and second surfaces which are substantially planar and which are substantially parallel to each other, the substantially planar surfaces of said fixed drum being perpendicular to the axis of rotation of said rotatable drum means, said rotatable drum means being made of a magnetic shielding material and including a flywheel fixed to a drive shaft for providing rotation to said rotatable drum means;
(c) an overhanging plate fixedly secured to said fixed drum so as to be placed over said rotatable drum means;
(d) a pair of recording magnetic transducers for recording signals on a magnetic medium, said recording magnetic transducers being disposed on said first surface of said rotatable drum means facing said fixed drum;
(e) a pair of playback monitoring magnetic transducers for reproducing the signals recorded by said recording magnetic transducers on said magnetic medium, said playback monitoring magnetic transducers being disposed on said first surface of said rotatable drum facing said fixed drum;
(f) a first rotary transformer comprising a first rotor fixed with respect to said first surface of said rotatable drum means and a first stator fixed to the surface of said fixed drum facing said rotatable drum means so as to axially confront said first rotor thereof;
(g) a second rotary transformer disposed to be axially spaced from said first rotary transformer with said rotatable drum means interposed therebetween, and comprising a second rotor fixed with respect to said second surface of said rotatable drum means and a second stator fixed to said overhanging plate to axially confront said second rotor; and
(h) a pair of first signal transmission paths respectively provided between said pair of recording magnetic transducers and said first rotor, and a pair of second signal transmission paths respectively provided between said pair of playback monitoring magnetic transducers and said second rotor, said first transmission paths being electrically joined through said first stator to a first signal cable and said second transmission paths being electrically joined through said second stator to a second signal cable, extending away from each other with said rotatable drum means therebetween, whereby said rotatable drum means serves as a crosstalk shield between said first and second rotary transformers, between said first and second signal cables, and between said recording magnetic transducer and said playback monitoring magnetic transducer.

3. A head drum construction as claimed in claim 2, wherein each of said first signal transmission paths comprises a printed-circuit board secured to said flywheel, a first wire interconnecting said first rotor and said printed-circuit board, a relay pin connected to said printed-circuit board, and a second wire interconnecting one of said recording magnetic transducers and said relay pin, said relay pin and said second wire having interconnected portions covered by a shield cover mounted on said second surface of said rotatable drum means.

4. A head drum construction as claimed in claim 2, wherein each of said second signal transmission paths comprises a first wire connected to one said playback monitoring transducers, a first printed-circuit board mounted on said rotatable drum means and connected to said first wire, a second wire interconnecting said first printed-circuit board and said second rotor, a third wire connected to said second stator, and a second printed-circuit board connected to said third wire.

5. A head drum construction as claimed in claim 4, further including a back plate disposed on said second stator and adjustably fastened together with said second printed-circuit board to said overhanging plate.

* * * * *